E. VERNEUIL.
SAFETY PLUG FOR VESSELS CONTAINING INFLAMMABLE LIQUIDS.
APPLICATION FILED OCT. 20, 1913.

1,102,559.

Patented July 7, 1914.

WITNESSES
W. C. Cornish
N. J. Dunbar

INVENTOR
E. Verneuil.
BY Percy H. Moore
ATTY.

UNITED STATES PATENT OFFICE.

EGISTE VERNEUIL, OF PARIS, FRANCE, ASSIGNOR TO SOCIETE HENRI GRAS & CIE., OF PARIS, FRANCE, A CORPORATION OF FRANCE.

SAFETY-PLUG FOR VESSELS CONTAINING INFLAMMABLE LIQUIDS.

1,102,559. Specification of Letters Patent. Patented July 7, 1914.

Application filed October 20, 1913. Serial No. 796,362.

*To all whom it may concern:*

Be it known that I, EGISTE VERNEUIL, a citizen of the Republic of France, residing at Paris, France, have invented new and useful Improvements in or Relating to Safety-Plugs for Vessels Containing Inflammable Liquids, of which the following is a specification.

This invention relates to improvements in safety devices intended to be applied to receptacles or conduits of any kind, containing inflammable liquids, such as essences, petroleum, alcohol, etc., for the purpose of avoiding the lighting back of the outside flames into the interior of the receptacles or conduits, in the event of the ignition of the liquid or vapors outside the receptacles during manipulation, or fire arising from any other accidental cause. It is known that such devices rely upon causing the liquid to pass through conduits of a very small diameter, so as to cool the gases quickly and avoid any passage of the flame. Various devices of such a kind have been designed, and the present invention has for its object to provide an apparatus of an exceedingly simple and practical construction, of very great strength and absolute security, which can be instantaneously fitted to any receptacles or conduits whatever be their dimensions, and the apparatus can be easily built in any size without its efficiency being altered.

The apparatus chiefly consists of a combination of two tubes arranged one within the other and each provided with a series of alternating or staggered orifices, the inner tube being screwthreaded on its outer face so that the grooves between the screwthreads form very narrow conduits which are used to establish communication between the openings of the two tubes with each other, for the passage of the inflammable liquid.

The figures of the accompanying drawing show by way of example a safety apparatus according to this invention.

Figure 1:
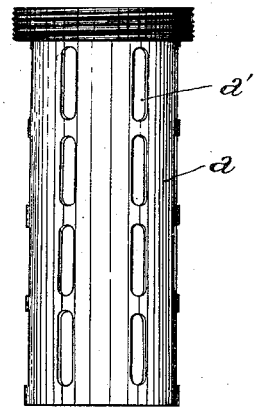
Figure 2:
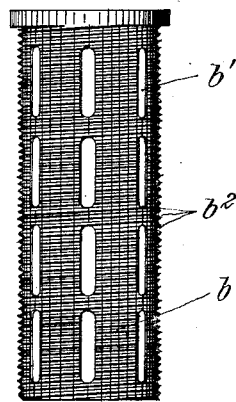
Figure 3:
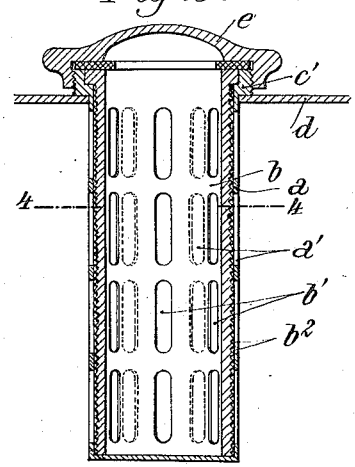
Figure 4:
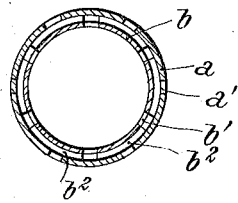

Fig. 1 is an elevation of the outer tube, Fig. 2 is a similar view of the screw-threaded inner tube, Fig. 3 is a longitudinal section of the complete apparatus in position in the wall of an inflammable liquid tank, Fig. 4 is a cross-section on line 4—4 of Fig. 3.

The apparatus comprises a pipe $a$ or a cylinder closed at the lower end and provided longitudinally with a series of equidistant ports or openings $a'$ of any desired number. These openings may be of any suitable shape. Thus, they can be longitudinal slots extending throughout the whole length of the tube. In the interior of the said tube $a$ another tube $b$ is secured screwthreaded on its outer face (Fig. 2) and fitting exactly into the first, in such a manner that the triangular or other screwthreads $b^2$ rest exactly against the smooth inner wall of the outer tube. The said tube $b$ is provided longitudinally with a series of equidistant ports or openings $b'$ also of any desired number, preferably similar to the openings $a'$, but the said openings $b'$, instead of coinciding with the openings $a'$, are staggered, that is to say they lie between the latter as shown in Figs. 3 and 4. The result is that the openings of the two tubes $a$ and $b$ are in communication with each other only by means of the very narrow conduits formed by the intervals between the screwthreads $b^2$. The apparatus can be fitted in any suitable manner to receptacles, such as cans, tanks, piping, etc. To that end, the tube $a$ can be provided with a shoulder $c$ adapted to be secured by soldering, brazing or screwing to an opening in the wall of a receptacle or tank $d$, and a closing cap $e$ for instance can be used, it being understood that the method of securing may be varied at will, according to the kind of receptacle or conduit to which the apparatus is to be applied.

The inner tube $b$ can be held in position in the interior of the tube $a$ by soldering at its ends or by projections engaging the openings $a'$ and $b'$ in the proper relative position. The device being thus fitted to a receptacle or tank, the liquid is poured into the tube $b$, and passes through the openings $b'$ where it is divided across all the small passages formed between the screw-threads $b^2$ before escaping through the openings $a'$ of the tube $a$. The direction of travel of the liquid is reversed when the receptacle or tank is emptied. It is preferable to arrange this apparatus at each of the orifices for the liquid, as for instance in petrol tins with a discharge spout, or in petrol tanks for motor vehicles. The large number of conduits allows a quick escape of the liquid, and their small cross-section insures quick cooling of the gases and completely stops the passage of any flame from the outside, so that the liquid in the pipe $b$ can be ignited without any danger of the flames getting into the tank to which it is fitted. A very important advantage of the present device is that the rigidity of the outer pipe protects in an efficacious manner the screw-threads forming the conduits, against any outer shock, so that they cannot become accidentally deformed or enlarged, and that the use of screw-threads constitutes an exceedingly simple and economical process for forming conduits of the desired regular size and of even pitch.

The sleeve is constituted by plates $f$ and $g$ alternating with each other, the former being smooth and the latter fluted on one of their faces. The plates $f$ are welded to the fluted face of the plates $g$ and partly cover them. As soon as a band of suitable length has been obtained by welding the plates $f$ and $g$, the said band is curved and the two extreme edges are welded, then at the bottom of the said tube is welded a disk $h$ which forms its bottom. In that way, a safety sleeve is obtained which can play the part of that represented in Figs. 1-4. The portion of flutes covered by the plates $f$, forms narrow parallel conduits which afford passage to the liquid and produce a cooling which prevents the ignition from spreading into the interior.

The device hereinbefore described has the advantage of very simple construction and of not requiring, like that previously described, the adjusting of two pipes one within the other.

Claim.

In a safety or flame stopping plug adapted to fit the opening of a receptacle or conduit for inflammable liquids, the combination of two tubes fitting into, and secured to each other, each tube being provided with openings arranged in staggered relationship with those on the other tube, the inner tube being screw-threaded on its outer face so as to form conduits or passages of very small cross-section which establish communication between the staggered openings of the tubes, means being provided for securing the device to the receptacle or conduit to which it is fitted.

In testimony whereof I affix my signature in presence of two witnesses.

EGISTE VERNEUIL.

Witnesses:
 LUCIEN MEMMINGER,
 EDMOND JACQUOT.